(12) United States Patent
Rattunde

(10) Patent No.: US 8,495,942 B2
(45) Date of Patent: Jul. 30, 2013

(54) SAW BLADE

(75) Inventor: Ulrich Rattunde, Bentwisch (DE)

(73) Assignee: Rattunde & Co GmbH, Ludwigslust (DE)

( * ) Notice: Subject to any disclaimer, the term of this patent is extended or adjusted under 35 U.S.C. 154(b) by 337 days.

(21) Appl. No.: 12/594,379

(22) PCT Filed: Mar. 28, 2008

(86) PCT No.: PCT/DE2008/000522
§ 371 (c)(1),
(2), (4) Date: Oct. 2, 2009

(87) PCT Pub. No.: WO2008/122264
PCT Pub. Date: Oct. 16, 2008

(65) Prior Publication Data
US 2010/0037745 A1 Feb. 18, 2010

(30) Foreign Application Priority Data
Apr. 4, 2007 (DE) .......................... 10 2007 016 207

(51) Int. Cl.
*B23D 61/06* (2006.01)
*B23D 65/00* (2006.01)

(52) U.S. Cl.
USPC .................................. 83/839; 83/848; 76/112

(58) Field of Classification Search
USPC ....................... 83/838–845; 76/112
See application file for complete search history.

(56) References Cited

U.S. PATENT DOCUMENTS

| 237,472 | A | * | 2/1881 | Blackburn | 451/544 |
|---|---|---|---|---|---|
| 1,293,897 | A | * | 2/1919 | Parker | 125/15 |
| 1,502,697 | A | * | 7/1924 | Tone | 451/543 |
| 2,285,315 | A | | 3/1941 | Thompson | |
| 3,633,637 | A | * | 1/1972 | Kolesh et al. | 83/840 |

(Continued)

FOREIGN PATENT DOCUMENTS

| CH | 452871 | 3/1968 |
|---|---|---|
| DE | 507472 | 9/1930 |

(Continued)

*Primary Examiner* — Laura M. Lee
(74) *Attorney, Agent, or Firm* — Varnum Riddering Schmidt & Howlett LLP

(57) ABSTRACT

The invention relates to a sawing tool comprising a substantially disk-shaped support (1) from which a plurality of tooth inserts (4) project which are juxtaposed along a supporting edge (3) and have at least one sawtooth (12) each with at least one tooth rear (12) and at least one blade (9). The tooth inserts (4) are connected to the support (1) in a position-stable manner even when the sawing tool is operated. The supporting edge (3), in its cross-section perpendicular to the plane of the disk, has a rooflike shape and the tooth inserts (4) have a mounting (8) configured as a rooflike recess mating the roof shape of the supporting edge (3). Recesses (13) and/or bulges are arranged along the supporting edge (3) and are associated with corresponding bulges (14) and/or recesses on the interior of the mounting (8) of a tooth insert (4) and the bulges (14) fit into the corresponding recesses (13) in a form-fit manner.

16 Claims, 4 Drawing Sheets

U.S. PATENT DOCUMENTS

| | | | | |
|---|---|---|---|---|
| 4,069,622 A | * | 1/1978 | Swarovski | 451/543 |
| 4,102,231 A | * | 7/1978 | Jagers | 83/854 |
| 4,484,560 A | * | 11/1984 | Tanigawa | 125/15 |
| 4,727,778 A | * | 3/1988 | Omi | 76/112 |
| 5,191,873 A | * | 3/1993 | Browning et al. | 125/15 |
| 5,249,566 A | * | 10/1993 | Sawluk | 125/15 |
| 5,465,706 A | * | 11/1995 | Sawluk | 125/15 |
| 5,761,981 A | * | 6/1998 | Stoffels | 83/840 |
| 6,058,923 A | * | 5/2000 | Arntz et al. | 125/15 |
| 6,298,762 B1 | * | 10/2001 | LaRue et al. | 83/838 |
| 7,150,215 B2 | * | 12/2006 | Krehel | 83/839 |

FOREIGN PATENT DOCUMENTS

| | | |
|---|---|---|
| DE | 2606598 | 8/1977 |
| DE | 820339 | 7/1982 |
| DE | 19901208 | 7/1999 |
| DE | 10224596 | * 11/2003 |

* cited by examiner

SAW BLADE

CROSS REFERENCE TO RELATED APPLICATIONS

This is a National Phase application based on International Application Serial No. PCT/DE2008/000522 filed Mar. 28, 2008, which claims benefit of priority of German Patent Application No. 10 2007 016 207.5 filed Apr. 4, 2007.

STATEMENT REGARDING FEDERALLY SPONSORED RESEARCH OR DEVELOPMENT

Not applicable.

REFERENCE TO A MICROFISHE APPENDIX

Not applicable.

BACKGROUND OF THE INVENTION

1. Field of the Invention

The invention relates to a sawing means according to the preamble of claim 1, and to a method for producing the sawing means.

2. Background Art

Saw blades are well known in the prior art in the form of circular saw blades From DE 20 2005 003 643 U1, a circular saw blade is known which comprises a carrier, from which there protrude, along the circumference of the circular saw blade, tooth backs formed in one piece with the carrier. The actual sawtooth with a cutting edge is formed on each tooth back in a manner pointing in the sawing direction.

The cutting edges and the tooth backs are separate components. The cutting edges are formed from harder material than the tooth backs. One disadvantage of the known prior art is that, in order to fix the cutting edge to the tooth back, the tooth back itself must have a minimum width in the sawing direction in order to ensure sufficient stability. The cutting edge is soldered onto the tooth back. In the process, the cutting edge can easily tilt out of its orientation running perpendicular to the sawing direction, so that it usually has to be resharpened. As a result of the resharpening, coatings applied to the sawtooth are damages, and therefore the saw blade as a whole has to be recoated.

BRIEF SUMMARY OF THE INVENTION

The object of the invention is to provide a sawing means which can be produced more easily compared to the prior art.

This object is achieved by a sawing means as specified in the introduction having the characterizing features of claim 1.

The at least one tooth insert is fixed to the carrier in the positionally stable manner. The tooth insert is a separate component prior to being mounted on the carrier. Positionally stable means that the tooth insert does not change its relative position with respect to the carrier even during sawing operation and under the effects of force.

According to the invention, the carrier edge of the disc-shaped carrier is substantially roof-shaped in a cross-section transverse to the disc plane. As a mount, the tooth inserts have a roof-shaped cutout matching the roof shape of the carrier edge. After mounting, the cutout matches the carrier edge with a form fit. According to the invention, in order to increase the positional stability during sawing operation, cutouts and/or bulges are provided which are arranged along the carrier edge. The cutouts and/or bulges correspond to corresponding bulges and/or cutouts arranged on the inside of the mount of the tooth insert. During production of the sawing means, the tooth insert with the mount is placed on the carrier edge with a form fit, wherein the cutouts and corresponding bulges slot together in pairs with a form fit. Since the effect of force during sawing operation runs in particular in the tangential direction of the disc-shaped carrier, the cutouts and corresponding bulges which engage in one another increase the positional stability of the tooth inserts on the carrier edge quite considerably.

The tooth insert comprises at least one complete sawtooth with in each case at least one cutting edge and at least one tooth back. The at least one sawtooth, preferably each of the sawteeth, may also have just one cutting edge and just one tooth back. The tooth back extends from the cutting edge to the carrier. The cutting edge and the tooth back are formed integrally and preferably also homogenously from the second material.

The tooth insert is preferably formed in one piece. In this case, the tooth in insert comprises at least one sawtooth which in turn comprises at least one cutting edge with a tooth back. The entire tooth insert is preferably a one-piece and integrally formed component.

Preferably, the tooth insert comprises a second material and the carrier comprises a first material. In this case, the second material is harder and less susceptible to wear than the first material.

Preferably, the entire row of sawteeth of the sawing means running circumferentially around the carrier is formed of tooth inserts. Tooth inserts which in each case comprise one complete sawtooth are placed on the carrier along a carrier edge. The tooth insert is preferably formed in one piece and is preferably made substantially entirely from the second material, which comprises carbide steel for example. The second material is in principle harder than the first material.

The second material, unlike the first material, is suitable for continuous sawing operation. Compared to the known prior art, the tooth insert can be placed onto the carrier edge without any problem. The tooth insert maintains the predefined position with a high degree of precision. Due to the one-piece design of the cutting edge and tooth back, there is no need for separate attachment of the cutting edge and the tooth back can thus be designed to be narrower in the sawing direction than in the case of a design consisting of multiple parts, and it nevertheless has sufficient stability.

Sawing means are understood here to mean in particular circular saw blades and bands for band saws, but also elongate saw blades for hacksaws, jacksaws and the like. Circular saw blades are substantially rigid, while bands for band saws can be flexible; accordingly, the carriers of circular saw blades are rigid and preferably circular, while the carriers of bands for band saws are band-shaped and flexible.

Preferably, the cutting edges and trailing tooth backs of each sawtooth of the saw blade are in each case formed in one piece from the second material. Preferably all the sawteeth should form part of in each case one associated tooth insert, so that the sawing means as a whole can be formed from just two differently shaped components, i.e. the carrier and a plurality of structurally identical tooth inserts.

In principle, two or more structurally different tooth inserts may also be provided. By way of example, the row of teeth may consist of alternating double-tooth and triple-tooth tooth inserts.

In one particularly preferred further development of the invention, each tooth insert comprises at least two successive sawteeth; with particular preference, each tooth insert comprises precisely three successive sawteeth. The preferred further development of the invention makes it possible to further shorten the tooth back in the sawing direction and thus to reduce the tooth spacing. A reduced tooth spacing gives rise to an improved sawing performance. As an additional advantage of a multiple-tooth tooth insert, it has been found that the tooth insert can be mounted in a particularly secure and positionally stable manner on the carrier edge, and no readjustment or resharpening of the cutting edges of the tooth insert is necessary.

In order to compensate stresses in the carrier, in each case a groove transverse to the row of teeth is provided between successive tooth inserts along the row of teeth.

An improved sawing performance is obtained if a cutout is provided in the sawtooth on the carrier side of the cutting edge, which cutout is arranged between the cutting edge and the carrier and is substantially spoon-shaped.

In one preferred embodiment of the invention, cutouts which are preferably arranged periodically along the carrier edge are provided. Each cutout is assigned a bulge arranged on a tooth insert on the inside of the mount. When the tooth insert is mounted on the carrier edge, the bulged can be inserted into the cutout with a form fit. Due to the interaction of the cutout and the bulge, the stability of the tooth insert in the circumferential direction is increased and the service life of the saw blade as a whole is extended. In addition, the interaction of the cutout and bulge allows the precise positioning of the tooth insert on the carrier edge in the circumferential direction during mounting. The cutout may be designed in the shape of a cone, and the protrusion may protrude as a correspondingly, cone-shaped pin on the inside of the amount. The cutout and the protrusion preferably establish a form-fit connection.

With regard to the method, the invention is achieved by a method specified in the introduction having the features of claim 14.

The above-described sawing means is simpler than the prior art, i.e. can be produced in fewer processing steps and therefore more cost-effectively.

Firstly, a carrier made from the first material is provided. The carrier may be formed for example from high speed steel. In particular, the carrier may be cut from a metal sheet by means of a laser. The carrier has a carrier edge which is roof-shaped in a cross-section transverse to the plane of the cutting edge and which provides a particularly large bearing surface.

According to the invention, material powder is pressed into just one hollow mould in order to form a tooth insert. As described above, the tooth insert comprises a mount configured as a substantially roof-shaped cutout, which precisely matches the roof shape of the carrier edge of the carrier so that, when the tooth insert is placed onto the carrier edge, a form-fit connection over the entire contact area is achieved. According to the invention, for each tooth insert, bulges and/or cutouts are arranged on the inside of the mount. The cutouts and/or bulges a shaped in such a way that they can be produced by means of a pressing process in a hollow mould. This requires that a sufficiently large pressure can b exerted on all side walls of the tooth inserts, in particular including on the side walls of the bulges and/or cutouts. The other side walls of the bulges are therefore preferably arranged permanently inclined with respect to one another in the radial direction. The same applies to the cutouts. Thereafter, the material powder pressed into the single hollow mould is hardened. The pressed material powder is preferably then hardened in a sintering process. The hardened tooth insert is then fixed on the carrier edge in a positionally stable manner, by fitting the at least one bulge and/or cutout of the tooth insert into the corresponding cutouts and/or bulges of the carrier edge with a form fit.

Independently of the carrier, the tooth inserts are formed from the second material, which is different from the first material and is preferably stronger than the first material. The second material may be carbide steel.

By means of the pressing process, almost any shapes of cutting edge can be formed, since the cutting edge need not be resharpened. For certain applications, however, resharpening is still very useful.

The tooth inserts have in each case at least one sawtooth having in each case one cutting edge and a respective associated tooth back. The sawtooth is integrally formed on a mount. The mount has along the sawing direction a roof-shaped cutout matching the carrier edge, which is thus preferably funnel-shaped in a cross-section perpendicular to the movement direction of the sawteeth during the sawing operation, i.e. in the sawing direction. The tooth insert can thus be placed on the carrier edge in a fixed position and can be soldered on at that location. Compared to the prior art, undesirable tilting and displacements of the cutting edge when fixing the tooth inserts onto the carrier edge are completely or at least largely avoided, since the tooth inserts are much larger and thus easier to handle than mounting the cutting edge on its own.

In one preferred further development of the invention, tooth inserts are formed which comprise at least tow, particularly preferably three, sawteeth arranged one behind the other. The tooth inserts provided for a saw blade can all be structurally identical, so that one saw blade can be produced in total from one carrier and a plurality of tooth inserts. For the case where the tooth insert is pressed and sintered, cost-effectively just one hollow mould need be provided.

Preferably, the tooth insert is provided with a protective layer before being soldered onto the carrier. The protective layer may be a titanium layer or a titanium alloy layer. Particularly hard coatings are achieved with protective layers which contain titanium carbon nitride (TiCN). The protective layer gives the tooth insert additional hardness and protects it in particular against corrosion. Because the tooth insert can be placed and soldered into position on the carrier edge without play, there is no longer any need for subsequent treatment of the sawtooth by resharpening the cutting edges so that these assume the precise intended position relative to the carrier.

The tooth insert may be sharpened directly after removal from the mould, so that particularly precise and sharp cutting edges are formed, and the sharpened tooth insert is then coated. The coated tooth insert can be soldered onto the carrier edge. There is no longer any need for resharpening and recoating after the soldering.

BRIEF DESCRIPTION OF THE VIEW OF THE DRAWINGS

The invention will be described on the basis of an example of embodiment four figures. In the figures.

DETAILED DESCRIPTION OF THE INVENTION

Figure 1:
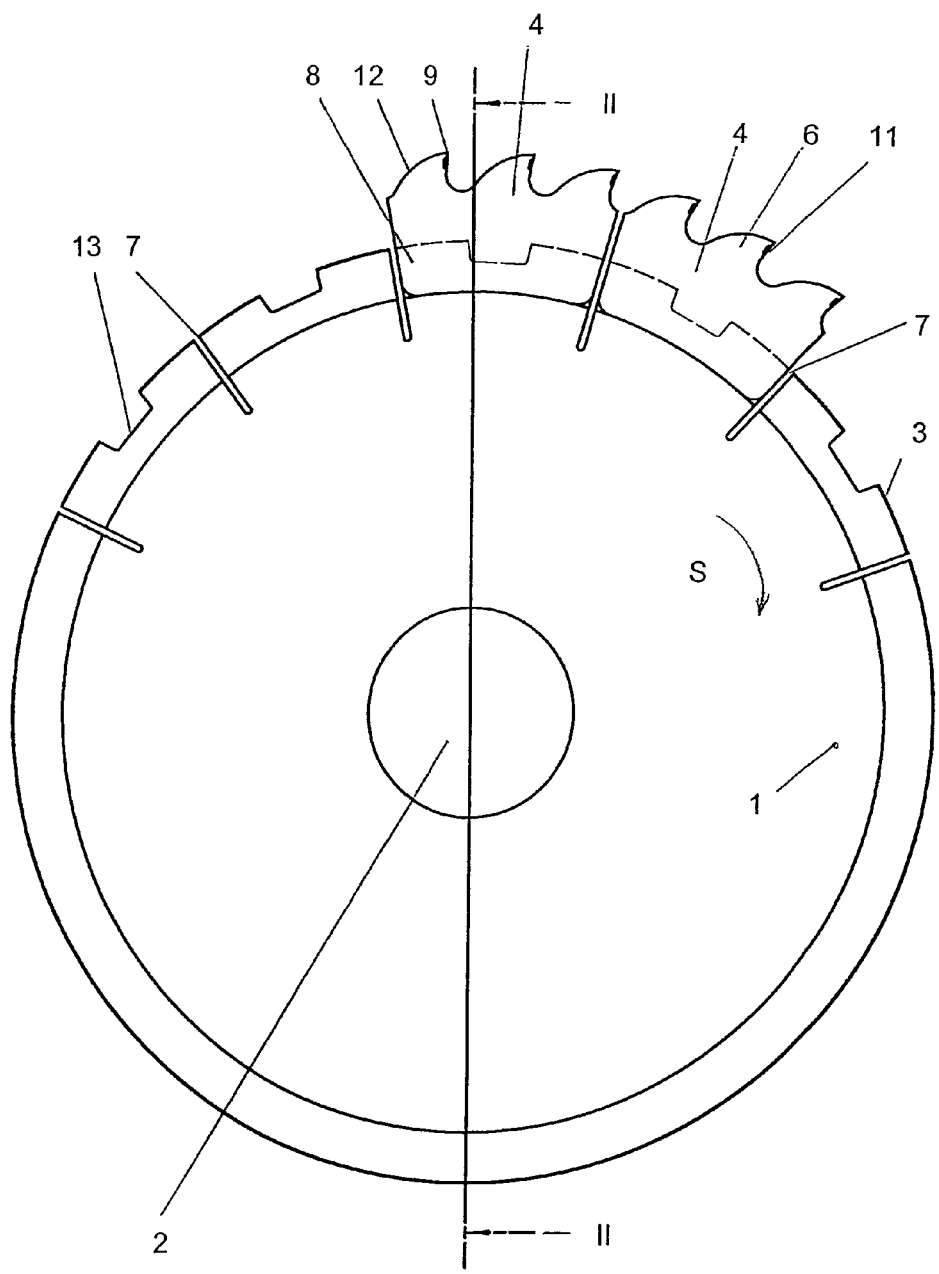
FIG. 1 shows a side view of a circular saw blade according to the invention.

The circular saw blade according to the invention which is shown in FIG. 1 comprises a disc-shaped carrier 1 with a centrally arranged hole 2 for attaching the circular saw blade to a sawing machine. Structurally identical tooth inserts 4 having in each case three sawteeth 6 are provided along a circumferential carrier edge 3. Between two adjacent tooth inserts 4, a radially running groove 7 is formed in the carrier 1. The length of the groove 7 corresponds substantially to the height of a mount 8 of the tooth insert 4.

The row of teeth running circumferentially around the circular saw blade is formed entirely by the triple teeth of the tooth inserts 4. During operation, the circular saw blade rotates in the sawing direction S.

Figure 2:
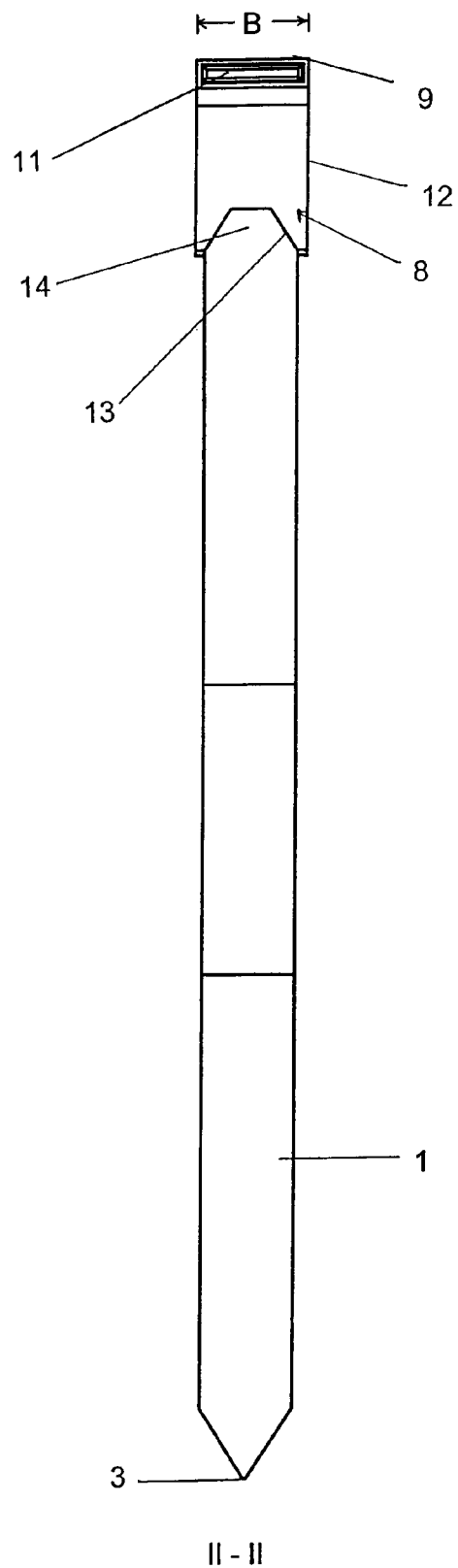
FIG. 2 shows a cross-sectional view of the circular saw blade in FIG. 1 along the line II-II.

The cross-sectional view shown in FIG. 2 with a partial front view of a tooth 6 of the circular saw blade shows a cutting edge 9 of the sawtooth 6, which extends over the entire width B of the sawtooth 6 on the upper edge thereof, said width running perpendicular to the sawing direction S. The cutting edge 9 leads in front of a tooth back 12. Next to the cutting edge 9 and facing towards the carrier 1, a substantially spoon-shaped cutout 11 is provided which facilitates the escape of sawdust produced during the sawing process.

Figure 3:
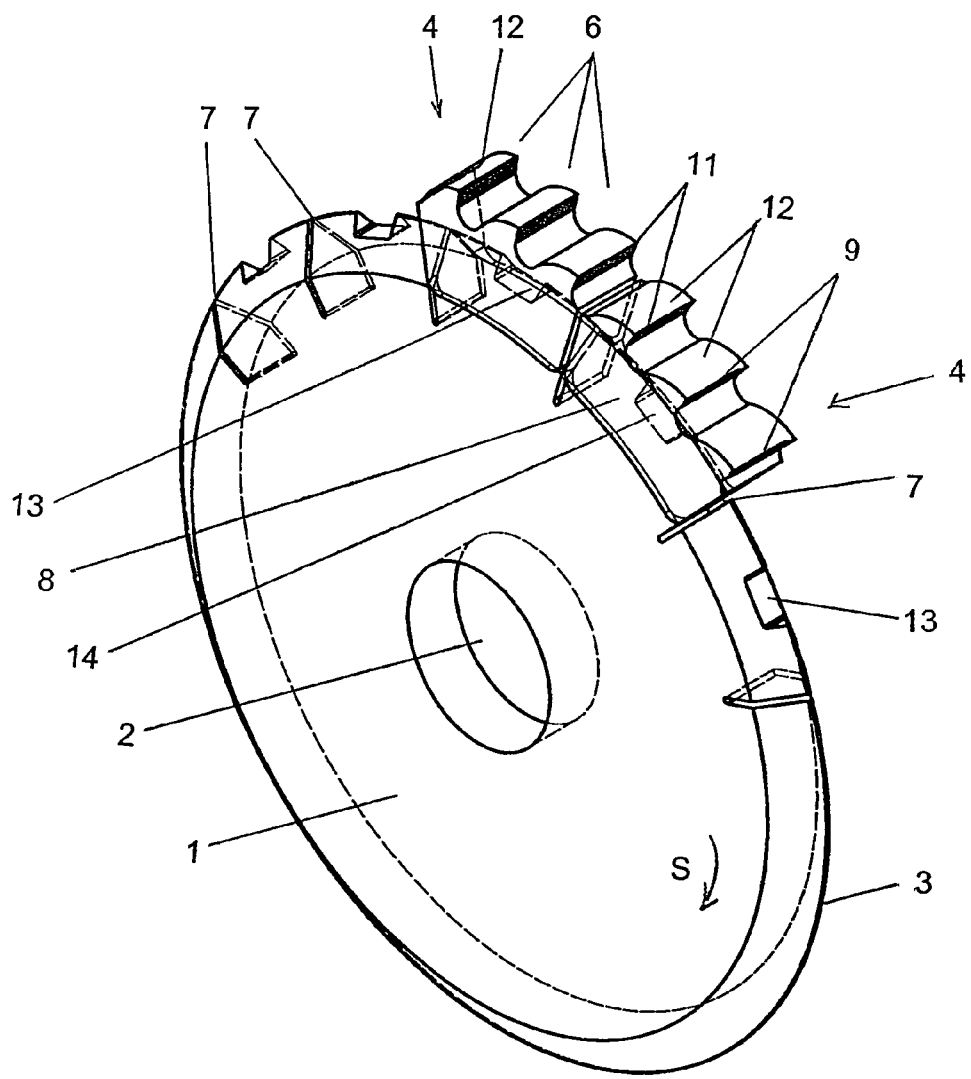
FIG. 3 shows a perspective view of a circular saw blade in FIG. 1.

FIG. 3 shows a circular saw blade with two mounted tooth inserts 4. The circular saw blade, once ready for use, comprises tooth inserts 4 fitted around the entire circumference of the carrier 1 and located immediately next to one another. The carrier 1 is preferably formed in one piece entirely from high speed steel. One-piece tooth inserts 4 made from carbide steel are soldered onto the carrier 1. Carbide steel is stronger and less susceptible to wear than high speed steel and therefore a long service life of the circular saw blade is possible.

In FIG. 3, grooves 7 and cutouts 13 are shown equidistantly and evenly offset from one another only along approximately one-third of the carrier edge 3. The carrier 1 intended for use has grooves 7 and cutouts 13 arranged around its entire circumference. The carrier 1 is designed in a rotationally symmetrical manner around the angular region covered by one tooth insert 4. The tooth inserts 4 are structurally identical and are arranged along the carrier edge 3 on the carrier 1. The sawteeth 6 thus form a sawtooth profile around the circumference of the carrier 1.

The modular construction of the circular saw blade according to the invention allows a simplified saw blade production compared to the prior art. Firstly, the carrier 1 of the saw blade is formed from high speed steel. the carrier edge 3 running in a circular manner around the circumference is substantially roof-shaped in a cross-section perpendicular to the sawing direction S. The cutting edge 9 runs perpendicular to the sawing direction S; independently of the production of the carrier 1, a series of tooth inserts 4 having in each case three sawteeth is formed from carbide steel.

Figure 4:
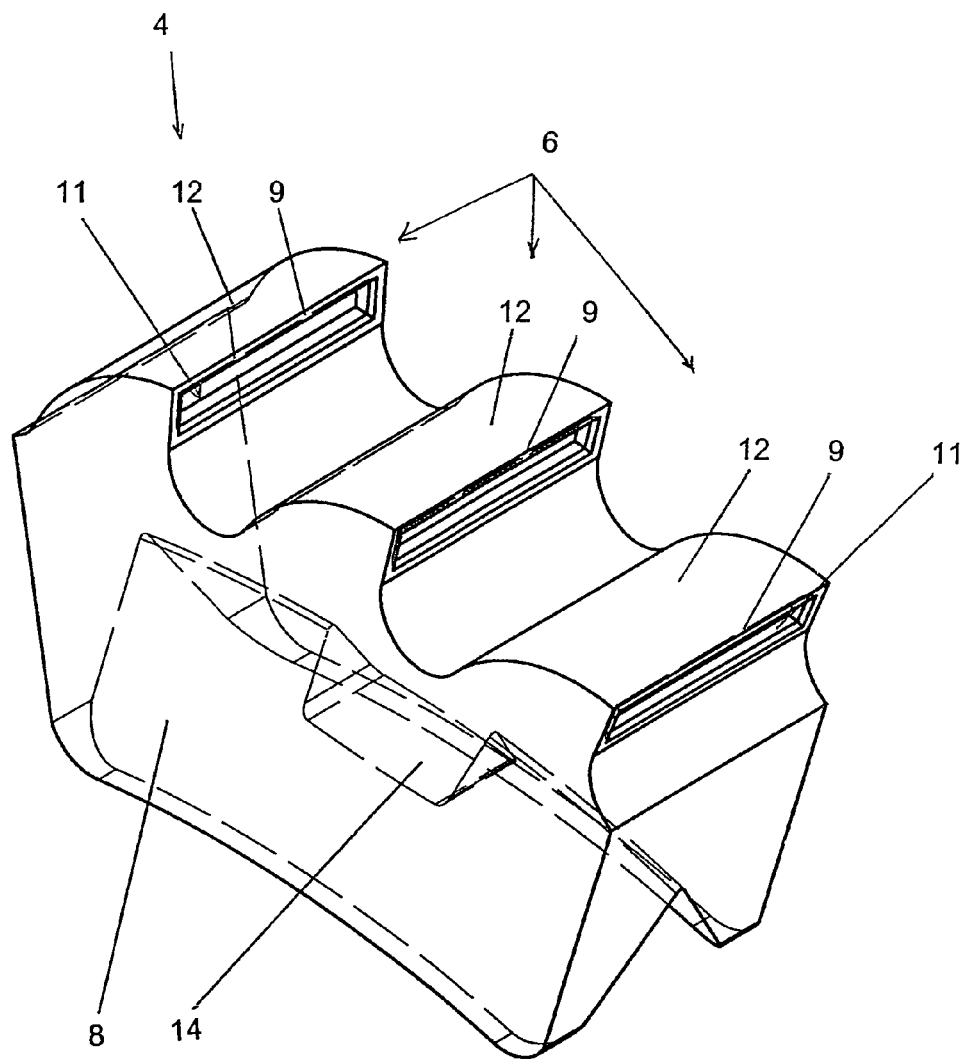
FIG. 4 shows a perspective view of a tooth insert according to the invention.

The tooth inserts 4 are structurally identical and are shown in a perspective view in FIG. 4. They have in each case a mount 8 on the carrier side, from which there protrude in each case the three sawteeth 6 with in each case one cutting edge 9 running perpendicular to the sawing direction S and one tooth back 12 trailing behind each cutting edge 9. The position of the sawteeth 6 of the tooth insert 4 matches the curvature of the carrier 1 along the carrier 3. In addition, the mount 8 is designed as a roof-shaped cutout in a cross-section perpendicular to the sawing direction S, matching the roof shape of the carrier edge 3.

The mount 8 is provided as a roof-shaped cutout running in front of a trailing tooth insert side, with a longitudinal dimension in the sawing direction S and a triangular cross-section perpendicular thereto, in which mount there protrudes in the centre a bulge 14 directed towards the carrier 1. The bulge 14 is dimensioned in such a way that, in the mounted state, it fits with a form fit into an associated cutout 13 arranged along the carrier edge 3. The interaction of the bulge 14 and the cutout 13 stabilizes the tooth insert 4 in particular in the sawing direction S during operation. In addition, the bulge 14 facilitates the mounting of the sawtooth on the carrier edge 3. The tooth insert 4 automatically engages in the correct position along the carrier edge 1 as a result of the mounting.

The tooth inserts 4 may be produced by a material pressed into a hollow mould and by subsequent sintering. The shape of the cutting edge 9 is determined by the configuration of the hollow mould and thus can be selected almost at will.

The tooth insert 4 once removed from the mould is coated and then the coated sawtooth insert 4 is soldered onto the carrier 1. The sawtooth insert 4 is sufficiently long and the mount 8 can be formed to match the carrier edge 3 in such a way that there is no longer any need for resharpening of the cutting edges 9 after the tooth insert 4 has been soldered on.

The invention claimed is:

1. Sawing means comprising a substantially disc-shaped carrier (1), from which there protrude a plurality of tooth inserts (4) which are arranged next to one another along a carrier edge (3) and which have in each case at least one saw tooth (12) with at least one tooth back (12) and at least one cutting edge (9), wherein the tooth inserts (4) are connected to the carrier (1) in a positionally stable manner even during sawing operation, characterised in that the carrier edge (3) is triangular shaped in a cross-section transverse to the disc plane, and the tooth inserts (4) have a mount (8) configured as a triangular shaped cutout and the cutout has a longitudinal dimension in the sawing direction (S) and a triangular cross-section perpendicular thereto and the cutout matches the triangular shape of the carrier edge (3), and cutouts (13) are provided which are arranged along the carrier edge (3) and to which there are assigned corresponding bulges (14) arranged on the inside of the mount (8) of a tooth insert (4), and the bulges (14) protrude in the center of the triangular shaped cutout directed towards the carrier (1) and the bulges (14) fit into the corresponding cutouts (13) with a form fit.

2. Sawing means according to claim 1, characterised in that the tooth inserts (4) are formed in one piece.

3. Sawing means according to claim 1, characterised in that each tooth insert (4) comprises at least three successive sawteeth (6).

4. Sawing means according to claim 1, characterised in that all the tooth inserts (4) are shaped in a structurally identical manner.

5. Sawing means according to claim 1, characterised in that in each case at least one groove (7) transverse to the row of sawteeth (6) is provided in the carrier (1) between successive tooth inserts (4) along the carrier edge (3).

6. Sawing means according to claim 1, characterised in that a cutout (11) is provided in the sawtooth (6) radially inside the cutting edge (9).

7. Sawing means according to claim 1, characterised in that the tooth inserts (4) comprise a second material and the carrier (1) comprises a first material, and the second material is harder and less susceptible to wear than the first material.

8. Sawing means according to claim 7, characterised in that the tooth inserts (4) are made substantially entirely from the second material.

9. Sawing means according to claim 7, characterised in that the first material is high speed steel.

10. Sawing means according to claim 7, characterised in that the second material is carbide steel.

11. Sawing means according claim 1, characterised in that the mount (8) is connected to the carrier edge (3) in a positionally stable manner via a soldered join.

12. Sawing means according to claim 1, characterised in that the at least one cutting edge (9) is coated with a protective layer.

13. Method for producing a sawing means according to claim 1, in which:

material powder is pressed into just one hollow mold in order to form a tooth insert (4) comprising at least one saw tooth (6) with at least one cutting edge (9) and at least one tooth back (12) and with a mount (8) configured as a triangular shaped cutout which matches a triangular shaped carrier edge (3) of a carrier (1), and the cutout has a longitudinal dimension in the sawing direction (S) and a triangular cross-section perpendicular thereto, and with at least one bulge (14) protruding in the center on the inside of the mount (8) of the tooth insert (4) directed towards the carrier (1), and the pressed material powder is hardened, and the hardened tooth insert (4) is then fixed along the carrier edge (3) in a positionally stable manner even during sawing operation, by fitting the at least one bulge (14) of the tooth insert (4) into corresponding cutouts (13) of the carrier edge with a form fit.

14. Method according to claim 13, characterised in that the pressed material powder is sintered.

15. Method according to claim 13, characterised in that the tooth inserts (4) are soldered onto the carrier (1).

16. Method according to claim 13, characterised in that the at least one cutting edge (9) is coated with a protective layer before being fixed to the carrier (1).

\* \* \* \* \*